(12) United States Patent
Michael et al.

(10) Patent No.: US 7,599,473 B2
(45) Date of Patent: Oct. 6, 2009

(54) GREETINGS BASED ON PRESENCE STATUS

(75) Inventors: Michelle Michael, San Jose, CA (US); Jeffrey M. Blohm, Menlo Park, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 598 days.

(21) Appl. No.: 10/953,003

(22) Filed: Sep. 28, 2004

(65) Prior Publication Data

US 2006/0072715 A1 Apr. 6, 2006

(51) Int. Cl.
*H04M 1/64* (2006.01)

(52) U.S. Cl. .................. 379/76; 379/88.18; 379/88.22; 379/201.1

(58) Field of Classification Search ............... 379/88.12, 379/88.16, 88.22, 201.1, 220.01, 90.01, 41, 379/48, 51, 69, 88.23, 72, 76, 88.18, 93.01, 379/167.08, 263, 906; 709/206

See application file for complete search history.

(56) References Cited

U.S. PATENT DOCUMENTS

| | | | |
|---|---|---|---|
| 6,658,095 B1 | 12/2003 | Yoakam | |
| 6,757,722 B2 | 6/2004 | Lonnfors et al. | |
| 6,970,547 B2 | 11/2005 | Andrews et al. | |
| 2003/0161452 A1 | 8/2003 | Fournier et al. | |
| 2004/0059781 A1 | 3/2004 | Yoakum et al. | |
| 2004/0062383 A1 | 4/2004 | Sylvain | |
| 2004/0122901 A1 | 6/2004 | Sylvain | |
| 2004/0125941 A1 | 7/2004 | Yoakum et al. | |
| 2005/0044152 A1* | 2/2005 | Hardy et al. | 709/206 |
| 2005/0276397 A1* | 12/2005 | Hiatt et al. | 379/90.01 |
| 2006/0256948 A1* | 11/2006 | Crockett et al. | 379/220.01 |

OTHER PUBLICATIONS

International Search Report for PCT/US2005/029265, dated Nov. 14, 2005.

* cited by examiner

*Primary Examiner*—Md S Elahee
(74) *Attorney, Agent, or Firm*—Buckley, Maschoff & Talwalkar LLC

(57) ABSTRACT

A voice message system utilizes presence status information obtained from a presence server in playing inbox greeting to incoming callers. The presence status can indicate the actual presence or availability of the called user and is thus dynamic in nature. By using a voice message system to reflect and relay the presence status, the presence status information can be heard by those devices which do not have the capability to display presence information.

17 Claims, 6 Drawing Sheets

GREETINGS BASED ON PRESENCE STATUS

FIELD OF THE INVENTION

The present invention relates to telecommunications systems and, in particular, to voicemail and messaging systems.

BACKGROUND

In voicemail and other unified messaging systems, there is currently a means for indicating an availability status to an incoming caller. Often, this status is manually set by the called user using his or her voicemail or other similar system. Such systems are device specific in that the availability status is indicated for the device being called and not necessarily any other devices. Voice messaging systems typically use the following indications of user availability: 1) Forwarding for a particular reason: e.g. CFNR (Call Forward No Reply) indicates that the user did not answer the call, CFB (Call Forward Busy) indicates that the user is on another call with the same device, and CFDND (Call Forward Do Not Disturb) indicates that the user did not wish to be disturbed; 2) Time of Day: indicates that the user has probably left for the day 3) Holiday: indicates that the user is most likely not currently in the office; 4) User set availability: an alternate greeting (recorded and turned on by the user) is played such as "I am out of the office this week." Often, these indications must be manually set by the user.

These indications, while addressing availability, do not provide the type of dynamic information such as "Be right back" or "Out to lunch" that can be provided using presence status. Presence status is a semi-automated mechanism which allows for more granular and exact indications of a user's availability. There are currently many systems which track, monitor or poll for the presence status of users. The presence status can be sent using presence and instant messaging software on a user's computing device. The user may indicate the presence status to a presence server or similar mechanism. Presence status for a user is often relayed from the presence server to one or more requesting devices/users (called "watchers"). For presence status to make sense, however, it must be displayed to a user on a device capable of displaying and requesting such information. For instance, if a user on a land-line telephone wanted presence status information, it would typically not be available to them graphically (by text indication) since the land-line telephone is not equipped with that capability to request/handle presence status information. A prior patent application, System and Method for Presence Enabled Electronic Mail Folders, bearing Ser. No. 10/255,908, filed on Sep. 26, 2002, includes a thorough description of presence status operation, and is incorporated by reference herein.

Thus, there is a need for integrating presence status information with voice messaging systems and making information available to devices that are traditionally not capable of supporting presence status.

DETAILED DESCRIPTION

Figure 1:
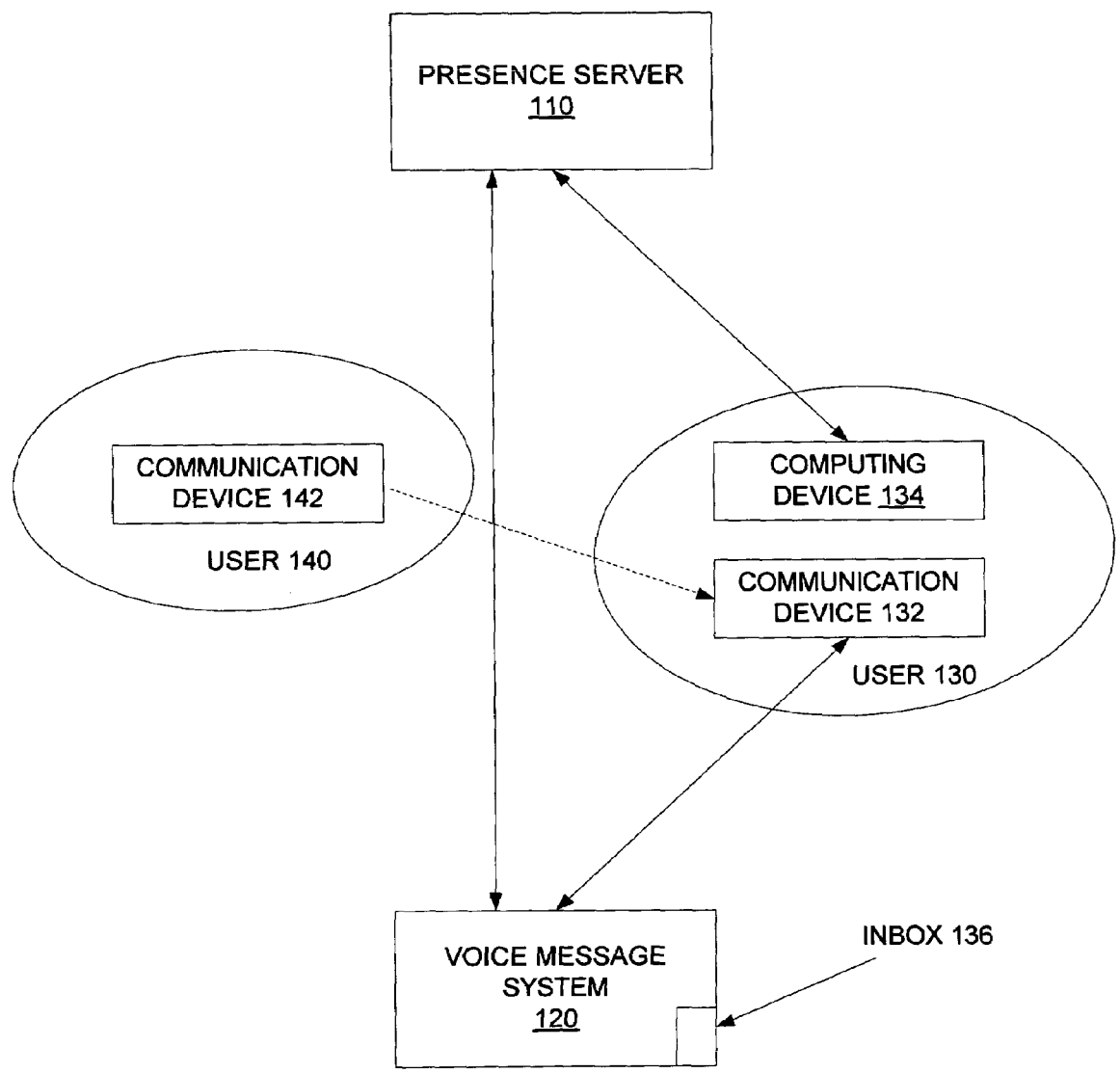
FIG. 1 is a diagram of a system according to an embodiment of the present invention.

Turning now to the drawings and, with particular attention to FIG. 1, a diagram of a system 100 according to an embodiment of the present invention is shown. FIG. 1 shows two users 130 and 140. User 140 utilizes a communication device 142. User 130 utilizes both a computing device 134 and a communication device 132. The computing device 134 may be a personal computer such as a laptop or desktop personal computer, a PDA (Personal Digital Assistant), handheld computer, server and the like or may be part of combined smart phone device having both communication and computing device functions such as the Siemens optipoint 400 SIP telephone. The computing device 134 is capable of running at least one application software which can communicate availability information regarding user 130 to a presence server 110. Presence server 110 collects and stores presence information regarding a plurality of users such as user 130. The application software running on computing device 134 can be presence and instant messaging software such as MSN Messenger™. Such software typically has a user availability indicator which can be set, in this case, by user 130 or automatically by the software. This availability information would be sent to the presence server 110 whenever a change occurs, or at a periodic interval, or both.

Communication devices 132 and 142 may each include one or more of the following devices or mechanisms: a POTS (Plain Old Telephone Service) device such as a traditional land-line telephone, a cellular telephone such as a GSM (Global System for Mobile communications) or CDMA (Code Division Multiple Access) based telephone, a satellite-based telephone or an IP (Internet Protocol) based telephone. Communication device 132 is complemented by a voice message system 120. Voice message system 120 may be accessible by a switch or PBX or the like or directly imbedded in device 132 such as in a answering machine or in a voice messaging system maintained by a service provider. The same switch or PBX may also route call traffic incoming to and outgoing from communication device 132. Voice message system 120 may include a plurality of voicemail in-boxes, one for a given user, and the like where calls to communication device 132 that are not answered are forwarded to. The voice message system 120 is exemplary of a store-and-forward system where messages from incoming callers can be stored and later retrieved by the intended called user. In this regard, voice message system 120 would maintain a voicemail inbox 136 for user 130 using communication device 132. The voicemail inbox 136 would include one or more "greetings" each of which can be played to callers who are forwarded to the in-box. Each in-box and the associated presence status can pertain to a user or a group of users, and in this regard, the application uses the term "user" to indicate whether an individual user or a group of users.

The greeting of the voicemail box 136 can be utilized to serve many different purposes. Chief among these is a user availability indication and instruction. For instance, the greeting may consist of "I am either on another call or away from my desk, please leave a message . . . ." This is exemplary of typical standard system greetings. Voice message system 120 may include the ability to program the inbox with a customized greeting, vacation greeting, alternate greeting and the like. Voice message system 120 may also typically play a "Busy" greeting when the called user is busy on another call. This is typical of what is available in today's voice message systems.

In accordance with the invention, however, the greeting played by voice message system 120 on behalf of user 130 can include a dynamic indication of actual presence status. Two primary functions are provided by the invention: 1) the ability to automatically provide a user's presence status and activate alternate or special greetings for a given inbox based on presence status; 2) the ability to play presence status information to incoming callers who are using devices that do not have access to a graphical display of presence status (such as in an instant messaging buddy list displayed on a computing device; and 3) the ability to reflect, in presence status information played to callers, aggregate presence information from multiple devices (which may indicate alternate user availability).

In at least one embodiment of the invention, the system 100 behaves as follows. Presence server 110 maintains a presence status for user 130. The allowed presence 'states' (possible status indications) will vary from user to user and application to application. Further, such states may be customized or user-defined. In some embodiments of the invention, the priority of greetings played to a caller to communication device 132 can be determined in part by the presence status as maintained in the presence server 110. In accordance with the invention, the presence server 110 and voice message system 120 are capable or accommodated with the capability to communicate with each other through a data network such as Intranet or a similar pathway. In some embodiments, a call is placed from user 140 (caller) using their communication device 142 to communication device 132 of user 130 (called user). If this call is answered the voice message system 120 is bypassed and does not operate. If the call is not answered for whatever reason, then it is forwarded to the voice message system 120.

In some embodiments of the invention, the voice message system 120 contacts the presence server 110 and queries the presence status of the called user, user 130. Based on the presence status, the voice message system 120 selects an appropriate greeting that is played to the caller, user 140. The greeting can include an indication of the presence status, as described below. For instance, the greeting that is played could be "I am out to lunch, and will attend to your request on my return". With such a message, the presence status is indicated in the greeting. This allows the presence status to be heard by the caller (user 140) even if the communication device 142 used to place the call does not have the capacity to display presence status. For instance, if communication device 142 were an ordinary land-line telephone, there may not be a means of retrieving and displaying the presence status of the called user. However, with the voice message greeting containing the presence status, it can be heard by the caller. Also, the presence status is in approximate real time since the presence server 120 is contacted and queried when the call is placed. In some embodiments of the invention, the presence server 110 can query or retrieve the current presence status from the called user's presence and instant messaging software, GPS or other presence indication/forwarding mechanism, or can simply use the current stored presence status when responding to the query from the voice message system 120.

Figure 2:
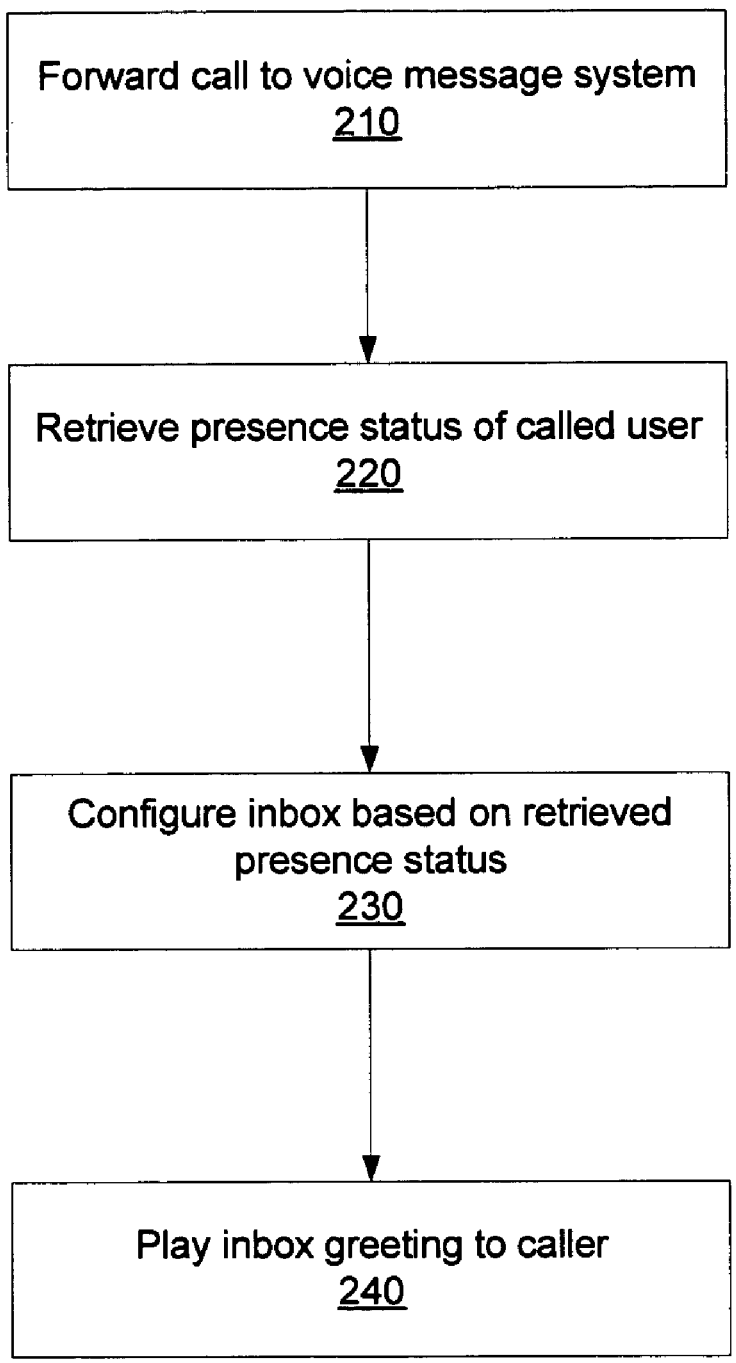
FIG. 2 illustrates a process flow according to at least one embodiment of the invention.

FIG. 2 illustrates a process flow according to at least one embodiment of the invention. A call placed by a caller to a called user which is not answered by the called user is forwarded to a voice message system (block 210). In a multimedia messaging system, the incoming call is analyzed by a call router, that looks at call related information (calling party, called party, redirection reason, etc.) to determine which application the call should get routed to. In this case, it is routed to the messaging application with the indication that "forward access" should be accessed. In accordance with the invention, the voice message system then retrieves the presence status of the called user (block 220). This can be done in any number of ways. One example is for the voice message system to poll or query a presence server which maintains and updates presence information for different users. Another is for the voice message system itself to be adapted to provide functionality similar to a presence server, and thus, internally query the presence status from its presence capability. Yet another is to assume that the presence status is reflected automatically in the greeting priority that is currently for the inbox of the called user. The voice message system can set an initial greeting priority for an inbox and thereafter be notified automatically of a change in presence status for the user of that inbox (also known as a subscription to the presence server). In this way, the presence server does not have to be queried whenever a greeting is to be played from an inbox. In such embodiments, the presence status of a called user is de facto "retrieved" merely by accessing the current priority level set for the inbox of that called user. In whichever manner the presence status is "retrieved," the inbox selects a greeting based on that retrieved presence status (block 230). In the case of actual querying of the presence server, the configuring may involve setting or changing the greeting selected to be played (see FIG. 3 and associated description). In embodiments where the presence status is assumed to be current because of ongoing automatic notifications by the presence server to the voice message system, configuring is done automatically by this process (see FIG. 5 and associated description). The inbox greeting can then be played to the caller by the voice message system (block 240).

Figure 3:
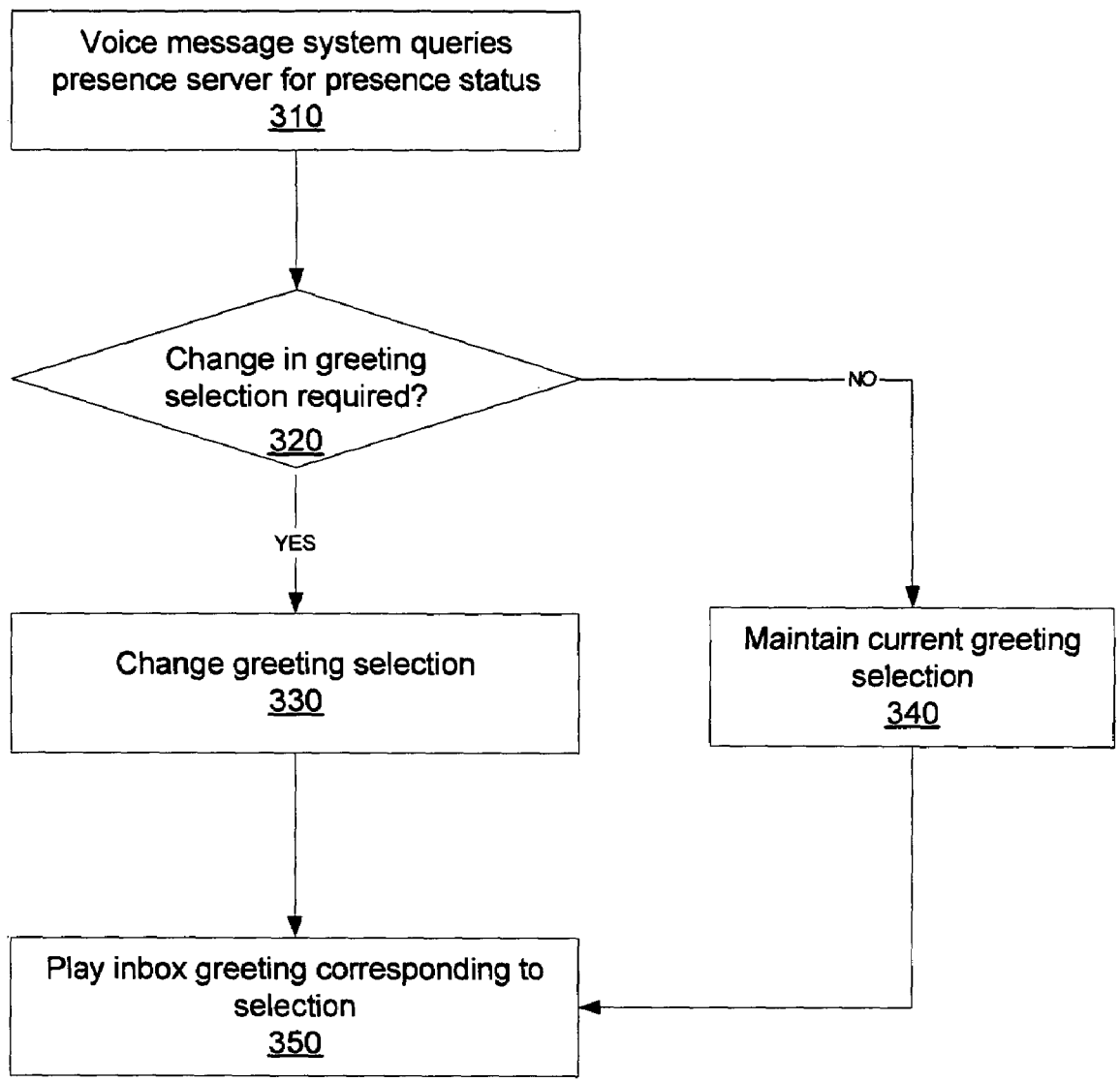
FIG. 3 illustrates at least one embodiment of voice message system operation.

FIG. 3 illustrates at least one embodiment of voice message system operation. In this embodiment, the voice message system queries the presence server for presence status of a called user (block 310). The query is triggered by the forwarding of a call to the voice message system indicating that the call was not answered for whatever reason. The query may be formulated by sending a unique ID, name, nickname or other identification for the called user. Typically, voice message systems are configured using inboxes, with at least one inbox reserved for a given user. The user is identified both by an extension or phone number and by the name of the user (for directory look-up and other such services). Typical voice message systems will already include a list of inbox names and optionally, but typically associated extensions/phone numbers. In-boxes may also be maintained on a voice message system for which there is no associated device. The extension or phone number relates usually however to the particular unique communication device used by a user. Likewise, the name is correlated to match or closely match the name of the user. The presence server would respond with the current presence status of the user. The query can also include the extension number or phone number or any other unique identifier (which is stored as part of the in-box configuration) to ensure uniqueness of the query key. The accepted formats would be dictated by the presence server As mentioned above, the voice message system will typically maintain a current greeting selection which is to be played from a list of available greetings which follow a particular priority order. The greeting selected to be played will change based upon circumstances and system indications, and in accordance with the invention, can also change if there is a change in presence status necessitating it (block 320).

Other than a change in presence status the current greeting selection may be set to particular greeting because the called user is busy on another call or because the called user has manually set a particular overriding greeting. If there is no change in presence status which necessitates a change in greeting selection, the current or previous greeting selection is maintained (block 340). If a change is greeting selection is deemed required due to presence status change (block 320) then the greeting selected to be played is changed (block 330). Examples and a description are set forth below. Finally, in either case, the voice message system will play the inbox greeting which corresponds to the selection that is currently set (block 350).

Figure 4:
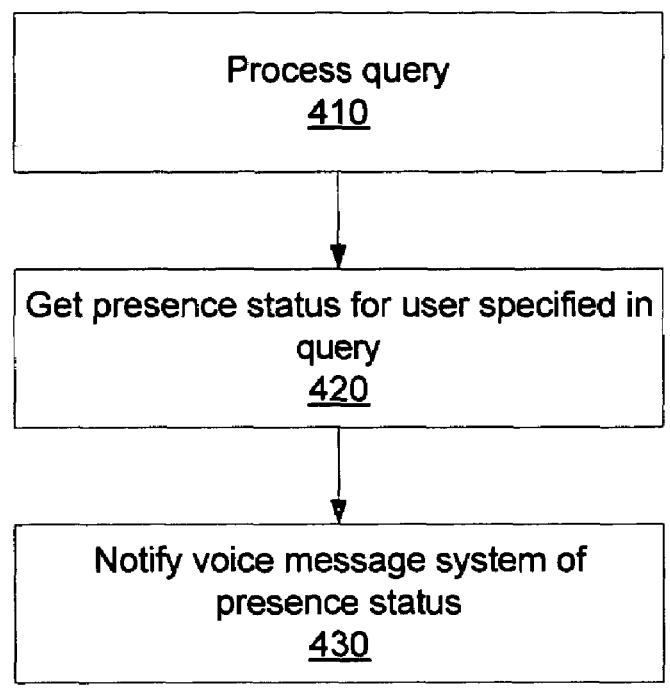
FIG. 4 is a block diagram of an exemplary presence server according to an embodiment of the present invention.

FIG. 4 illustrates at least one embodiment of presence server operation as used in at least one embodiment of the invention. As mentioned above, the voice message system can specifically query the presence server for the presence status of a user belonging to a particular inbox. Presence status information can be 1) queried for a single response 2) obtained on a polled basis (periodically) or 3) obtained automatically through subscription. The query which includes an identifier such as a name for a given inbox (or a list of names, one for each inbox) is processed by the presence server (block 410). The presence server can create a key (for instance, by formatting or using the name in full) to access presence status information as stored in its database. For instance, the name "John John" may be part of the query from the voice message system. The presence server would process this query and create a key into its database to retrieve the presence status for the user whose name is "John John". To avoid duplication of names, the query may include a phone number and name or other unique identifier such as e-mail address. The processing of the query would involve matching the name, or name and phone number, with a user record in the presence server database (block 420). According to block 420, the presence server uses the query or database key generated therefrom to get the presence status of the user specified by the query (block 420). The presence status can be retrieved from a stored data set within the presence server and/or obtained in real-time by the presence server using the presence mechanism (such as by GPS or other automatic location service, for example). The presence server then notifies the voice message system of the presence status of the user (block 430). This notification can take the form of indicating a greeting selection, but typically, the voice message system would be adapted to relate raw presence status to a greeting selection (see below).

Figure 5:
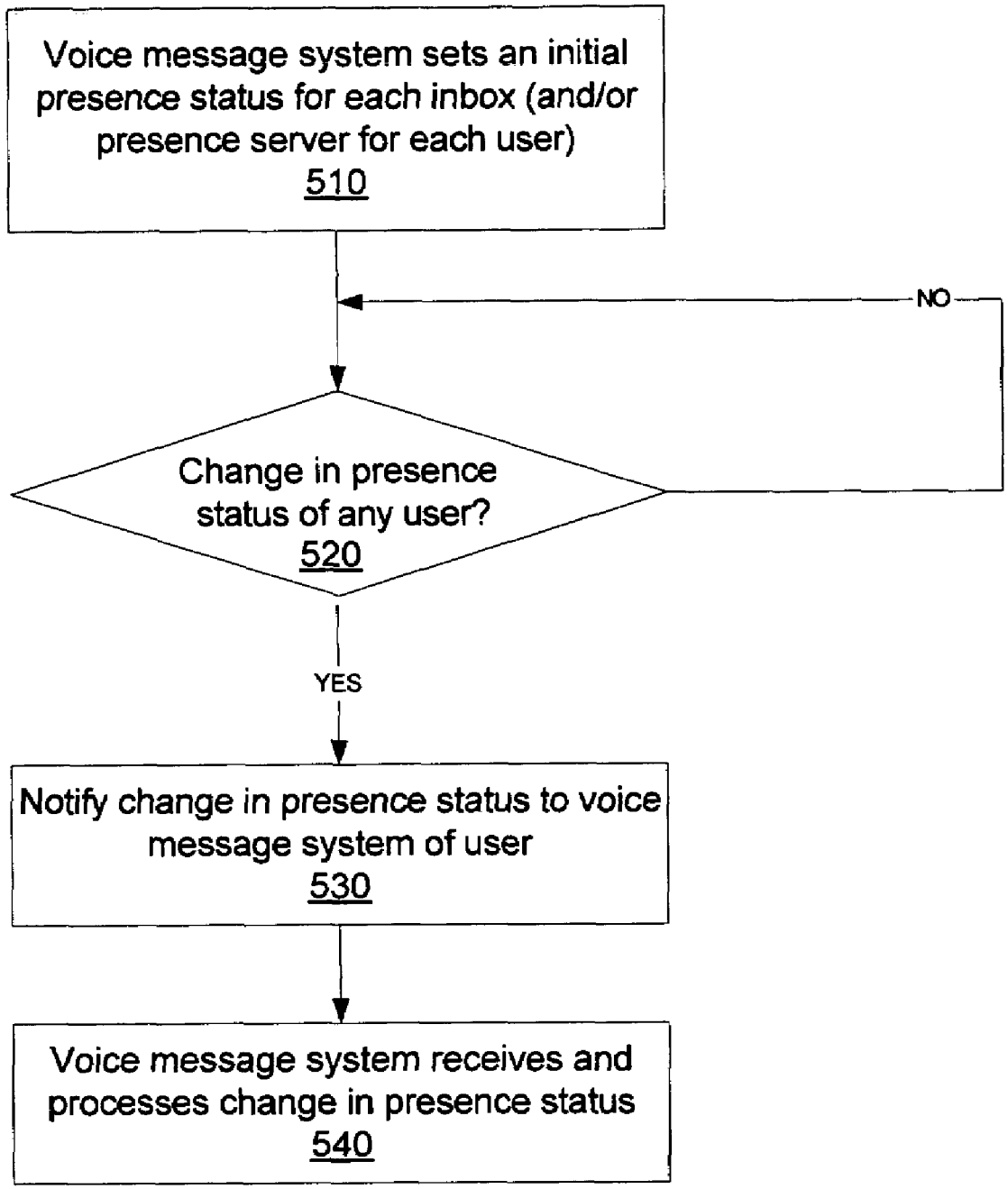
FIG. 5 illustrates at least one embodiment of presence server automatic notification operation.

FIG. 5 illustrates at least one embodiment of presence server automatic notification operation. In FIG. 5, the presence server automatically sends updates to presence status of users as they occur to the voice message system that has an inbox for that user. This is commonly referred to as the voice message system subscribing to the presence server. This is one alternative to the voice message system specifically querying for presence status based upon an event such as an incoming call. The voice message system and presence server sets an initial presence status for each user (by the presence server) or inbox (by the voice message system) (block 510). The voice message system does not set a presence status per se, but assumes a status such as available as an initial means of setting greeting priority. The presence server waits until a change in presence status of any user is detected (block 520). Once a change is detected, the presence server notifies the voice message system which has an inbox for that user of the nature of the change (block 530). The voice message system then receives and processes the change in presence status (block 540). This alternate process enables changes in presence status to be reflected nearly immediately and avoids the need for the added latency of querying the presence server when the voice message system answers a call. However, it may not be as advantageous as a query process (shown in FIG. 4) because potentially unnecessary information is being directed toward the voice message system thus increasing traffic thereto.

As mentioned above, voice message systems typically have a fixed greeting priority order. In accordance with the invention, however, a variety of presence states (status indications) may be used to modify the priority order. For instance, in an Xpressions™ messaging system (a product of Siemens AG), the priority order is usually as follows:

| Priority | Greeting | Set By |
|---|---|---|
| 1 | Alternate | User |
| 2 | Busy | Phone system |
| 3 | Closed/After Hours | By time/schedule |
| 4 | Internal | Phone system to other users in organization |
| 5 | Standard | Message system |

Typically, the "Alternate" greeting is a vacation or out of office message which is set manually by the user to indicate absentia. The "Busy" greeting is usually played when the user is on another call using the same phone/device to which a call is being placed. The "Standard" greeting covers all other situations when the user is not answering, but does not reflect actual presence status and is a function of the message system. The "Internal" greeting is used when the caller and called user belong to the same company, organization or group, and this can be identified by the phone system. The "Closed/After Hours" is not always used but can be used to play a greeting to indicate that business hours are over.

However, in accordance with the invention, the voice message system can take advantage of presence states in determining greeting priority and in playing greetings reflective of presence status, where applicable. As only one example of an endless possible combination of presence states, the following presence states could be used:

Idle
Offline
Out to Lunch
On the Phone
Be right back

These presence states can be incorporated into greetings played by a voice message system to callers. The presence states also have the effect of modifying the priority order of greetings and adding new greetings not conventionally possible. Using the above exemplary list of presence states, the following priority order is possible:

| Priority | Greeting | Set By |
|---|---|---|
| 1 | Alternate | User |
| 2 | Busy | Phone system/presence status |
| 3a | Out to Lunch | Presence status |
| 3b | Be right back | Presence status |
| 4 | Closed | Time/schedule |
| 5 | Internal | Phone system to other users in organization |
| 6 | Standard | Message system |

Again, the Alternate greeting which is a manually indicated state trumps and takes highest priority over other greetings.

The Busy greeting, which indicates the user is on another call can either be set to play by the phone system automatically (since it knows the user's phone is engaged) or by a presence status indicating that the user is on another call. The use of presence status to indicate that a Busy greeting be played enables the voice message system to take account of alternate communication devices such as a mobile phone which are not linked to the voice message system handling the call (though they may be linked to their own voice message system).

There are two "active" presence states, namely, "Out to Lunch" and "Be Right Back". These active presence states are incorporated into the priority order for greetings and have corresponding greeting messages that can be played to callers. For instance, in the case of the active state "Out to Lunch", the greeting message played could be "I am currently out to lunch, I will attend to your request shortly." Likewise, in the case of the active state "Be Right Back", the greeting message played could be "I am away from my desk and will be right back, please leave a brief message." The user can modify these greetings or record custom greetings for each of the active presence states if desired and if so enabled by the voice message system.

The other two presence states mentioned above, namely "idle" or "offline" are indeterminate as to actual presence status. For instance, if a presence and instant messaging application is used to provide presence status, an "idle" indication would be indeterminate. It could indicate that the user is away from the office or there, but not using the instant messaging or not using the computer. "Offline" is also indeterminate since it offers no actual presence information, other than that the presence status providing application is not running or not connected. If these two presence states are encountered, presence state is ignored (2, 3a and 3b) and the typical priority order takes hold (1-2, 4-6).

Figure 6:
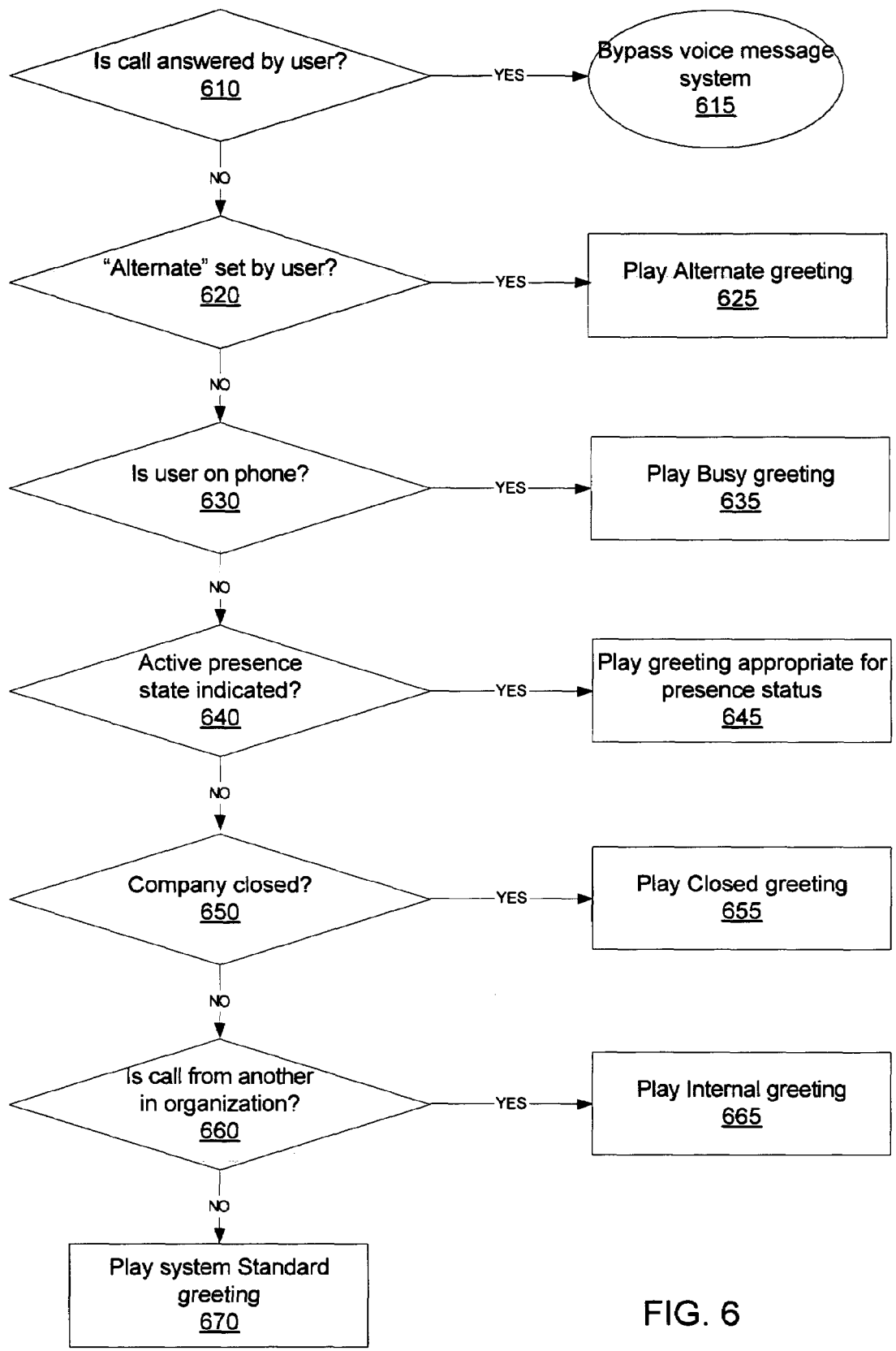
FIG. 6 illustrates the decision flow diagram of greeting priorities utilizing presence status.

The voice message system will point to or make active a particular greeting by matching indications and circumstances with the priority order. This matching process is shown in FIG. 6 with respect to the above exemplary presence states and priority. The priority order is reflected in decision flow diagram shown in FIG. 6. If an incoming call is answered by the user (checked at block 610), then the voice message system is bypassed (block 615). If not answered, then the call is handled by the voice message system. Regardless of actual presence status or other circumstance, an Alternate greeting will always have the first priority and thus, if set by the user as the current greeting (checked at block 620), the Alternate greeting will be played first (block 625). If not, then it is determined by the voice message system whether the user is on the phone (checked at block 630). This can be done in the conventional way that voice message systems do this, namely, by discovering whether the phone of the user is engaged currently or not. Alternatively, in accordance with the invention, there may be a presence status indicating that the user is on either the phone connected to the voice message system or a different secondary phone such as a cell phone. The use of presence status allows this flexibility and can enable a device-independent indication of whether or not the user is currently on another call. Either way, if the user is in another call, then the Busy greeting is played (block 635).

If the user is not busy on another call, then the presence state is considered. As mentioned above, the voice message system obtains presence status information from a presence server. The presence states include those that are "active" and "inactive". Inactive presence states are those such as "offline" or "inactive". These states are indeterminate as to the user's actual presence status. Active states on the other hand indicate a meaningful presence status, such as "out to lunch" or "be right back". There may be many possible active presence states. Each of these active states may have their own corresponding special greeting played from the voice message system or some states may share a special greeting. The expandability of possible presence states and corresponding greetings is limited only by system constraints both in the voice message system and presence server. If an active presence state is indicated by the presence server (checked at block 640), then the appropriate corresponding greeting is played (block 645).

If no active presence state is indicated, then decision flow proceeds to see if there is an after-hours or company closed indication (checked at 650). If so, the Closed greeting is played (block 655). This indication is often just a date/time event when it is expected that most users will be out of the office. Active presence states for a user would trump this greeting however. If the call is from another in the organization (and it is still office hours) (checked at block 660), then an internal company greeting is played (block 665). If none of these cases are true, then a standard system greeting, or the user's standard greeting would be played (block 670). Many of these blocks may or may not be in the decision flow of a particular voice message system and are merely exemplary. For instance, the Closed greeting may not exist at all, in which case, blocks 650 and 655 would not be present in the decision flow.

Further while the invention is described primarily in terms of "presence" states or status, it may also include the concept of availability states, and the voice message system also or alternatively queries (or subscribes and receives notification from) an availability server. An availability state can be a presence indication as well as an indication of what devices a user can be reached on. For instance, the user may be out of office, but still available on his cell phone (not connected to the voice message system of interest). Availability information provides yet more user status information and can also be dynamically used to determine what greeting to play. The table below illustrates an exemplary availability ordering:

| Order | Availability State |
| --- | --- |
| 1 | Available |
| 2 | Available on cell phone |
| 3 | At my desk |
| 4 | On phone |
| 5 | At lunch |
| 6 | In meeting |
| 7 | Not in the office |
| 8 | On vacation |
| 9 | Unavailable |

If there is an indication from the availability server that the user is available on the cell phone, then a corresponding greeting message "I can be reached on my cell phone at XXX-XXXX" could be played when a call is made to the user's land-line phone or other device. Many different availability states are possible, and as shown in the above table, availability can combine implicitly and explicitly what are ordinarily presence states. The interaction between an availability server and a voice message system may be similar to that of a presence server and a voice message system described above.

The invention described in the above detailed description is not intended to be limited to the specific form set forth herein, but is intended to cover such alternatives, modifications and equivalents as can reasonably be included within the spirit and scope of the appended claims.

What is claimed is:

1. A system for handling a call placed from a caller to a called user, comprising:
   a voice message system, said voice message system handling said call if said called user fails to answer said call, said voice message system maintaining an inbox for said called user; and
   a presence server that maintains presence information associated with a plurality of users and communicates a presence status of an active state or an inactive state for said called user to said voice message system, said voice message system further adapted to play a greeting indicative of said communicated presence status selected from a plurality of greetings based on said communicated presence status if said presence status is an active state, said played greeting providing aggregate presence information from multiple devices associated with said called user, wherein, said aggregate presence information is based on status information of said multiple devices.

2. The system according to claim 1 further comprising: a first communication device utilized by said caller to place said call, said first communication device adapted to receive said greeting and relay said greeting to said caller.

3. The system according to claim 1 further comprising: a computing device utilized by said called user, said computing device adapted to communicate presence status to said presence server.

4. The system according to claim 3 wherein said computing device runs an application to configure said presence status of said called user.

5. The system according to claim 4 wherein said application includes a presence and instant messaging application.

6. The system according to claim 1 wherein said voice message system queries said presence indication mechanism for the presence status of said called user when handling said call.

7. The system according to claim 1 wherein said voice message system is automatically notified by said presence indication mechanism for the presence status of said called user whenever the presence status changes.

8. The system according to claim 1 wherein said presence status is an active state if said presence status is neither one of offline nor inactive states.

9. The system according to claim 1 further comprising: an availability indication mechanism adapted to communicate an availability status of said called user to said voice message system, said voice message system further adapted to play a greeting indicative of said communicated availability status.

10. The system according to claim 9 wherein said availability indication mechanism is an availability server.

11. The system according to claim 10 wherein said presence indication mechanism is incorporated into said availability server.

12. A method for handling a call placed from a caller to a called user for when said call is not answered by said called user, the method comprising:
   forwarding said call placed from said caller to said called user to a voice message system, said voice message system maintaining an inbox for said called user;
   retrieving a presence status for said called user from a presence server that collects presence information associated with a plurality of users and communicates a presence status of an active state or an inactive state for said called user to said voice message system; and
   playing a greeting selected from a plurality of greetings based on said communicated presence status to said caller from said inbox of said voice message system, said played greeting being indicative of said presence status of said called user if said presence status is an active state and said played greeting providing aggregate presence information from a plurality of devices associated with said called user wherein, said aggregate presence information is based on status information of said plurality of devices.

13. The method according to claim 12 further comprising configuring said inbox with a greeting to be played for each active state presence status.

14. The method according to claim 12 further comprising: querying, by said voice message system said presence server for said presence status of said called user.

15. The method according to claim 12 wherein said presence server automatically notifies said voice message system of a change in presence status of said called user whenever said change occurs.

16. The method according to claim 12 further comprising: said voice message system selecting said played greeting based upon at least one of said presence status, a status of a called user device, organizational relationship of caller to called user, and manual called user setting.

17. The method according to claim 15 further comprising: sending presence status information to said presence server from a computing device utilized by said called user.

* * * * *